(12) United States Patent
Kao et al.

(10) Patent No.: US 9,092,063 B2
(45) Date of Patent: Jul. 28, 2015

(54) ELECTRONIC SYSTEM

(71) Applicant: PIXART IMAGING INC., Industrial Park, Hsin-Chu (TW)

(72) Inventors: Ming Tsan Kao, Hsinchu (TW); Shu Sian Yang, Hsinchu (TW); Han Ping Cheng, Hsinchu (TW)

(73) Assignee: Pixart Imaging Inc., Hsin-chu (TW)

( * ) Notice: Subject to any disclaimer, the term of this patent is extended or adjusted under 35 U.S.C. 154(b) by 114 days.

(21) Appl. No.: 13/926,724

(22) Filed: Jun. 25, 2013

(65) Prior Publication Data

US 2014/0079284 A1    Mar. 20, 2014

(30) Foreign Application Priority Data

Sep. 14, 2012  (TW) .............................. 101133606 A

(51) Int. Cl.
*G06F 3/01* (2006.01)
*G06F 3/041* (2006.01)
*G06F 3/042* (2006.01)

(52) U.S. Cl.
CPC .............. *G06F 3/017* (2013.01); *G06F 3/0418* (2013.01); *G06F 3/0421* (2013.01); *G06F 3/0425* (2013.01)

(58) Field of Classification Search
None
See application file for complete search history.

(56) References Cited

U.S. PATENT DOCUMENTS

| 6,128,003 A * | 10/2000 | Smith et al. ................... 345/157 |
| 2006/0050927 A1* | 3/2006 | Klomark et al. ............... 382/103 |
| 2013/0063336 A1* | 3/2013 | Sugimoto et al. ............. 345/156 |

* cited by examiner

*Primary Examiner* — Samir Ahmed
*Assistant Examiner* — Menatoallah Youssef
(74) *Attorney, Agent, or Firm* — Juan Carlos A. Marquez; Bacon & Thomas PLLC

(57) ABSTRACT

An electronic system incorporates an image-sensing device and a processor coupled with the image-sensing device. The image-sensing device includes an image-sensing area configured to generate a picture. The picture includes a noisy region. The processor is configured to select a tracking region from the portion of the picture outside of the noisy region. The tracking region corresponds to an operative region of the image sensing area.

16 Claims, 15 Drawing Sheets

ELECTRONIC SYSTEM

CROSS-REFERENCE TO RELATED APPLICATION

The present application is based on, and claims priority from, Taiwan Patent Application Serial Number 101133606, filed on Sep. 14, 2012, the disclosure of which is hereby incorporated by reference herein in its entirety.

BACKGROUND

1. Technical Field

The present invention relates to an electronic system.

2. Related Art

Image sensors generate images and can be applicable for different purposes. For example, an image sensor can be applied in a monitoring system in which a suspect hidden among people can be identified through analyzing the images generated by the image sensor. An image sensor can also be used in a video game console. The image sensor of a video game console can be moved and the movement of the image sensor can be calculated by analyzing the patterns of the images generated by the image sensor.

An image sensor usually comprises a plurality of sensing elements, which may convert light into voltages. An extra circuit is used to convert the voltages into digital data.

Using an image sensor to track the movement of an object relative to the image sensor to generate operational commands in an electronic device is a common input method. The object may reflect light to the image sensor to form a bright image on a picture generated by the image sensor. The movement of the object or the coordinates of the object relative to the image sensor can be obtained by correlating pictures generated by the image sensor or calculating the coordinates of the bright images of the pictures.

When the image sensor is capturing images, the image sensor receives the light reflected from the object, and simultaneously receives light in the environment. The light in the environment may be a source of noises of the pictures. High intensity environmental light may produce a bright image, which may be misinterpreted as a bright image produced by an object. Moreover, when the bright image produced by an object and the bright image produced by high intensity environmental light overlap, the image sensor may not correctly identify the bright image produced by the object. As a result, either incorrect coordinate data may be determined or coordinate data cannot be determined.

SUMMARY

One embodiment of the present invention provides an electronic system, which comprises an image-sensing device and a processor. The image-sensing device comprises an image-sensing area that generates a picture comprising a noisy region. The processor is coupled with the image-sensing device and configured to select a tracking region from the portion of the picture outside the noisy region, wherein the tracking region corresponds to an operative region of the image-sensing area.

Another embodiment of the present invention discloses an electronic system that comprises an image-sensing device and a processor. The image-sensing device generates a picture comprising a noisy region. The processor is coupled with the image-sensing device. The processor is configured to determine an edge of the noisy region, a portion of the picture outside the noisy region by the edge of the noisy region and a plurality of tracking regions from the portion of the picture. The processor is further configured to select a tracking region with a maximum area from the plurality of tracking regions.

Another embodiment of the present invention discloses an electronic system that comprises an image-sensing device and a processor coupled with the image-sensing device. The image-sensing device generates a picture comprising a noisy region. The processor is configured to determine coordinate data by the noisy region and to determine a tracking region using the coordinate data.

To provide a better understanding of the above-described objectives, characteristics and advantages of the present invention, a detailed explanation is provided in the following embodiments with reference to the drawings.

BRIEF DESCRIPTION OF THE DRAWINGS

The invention will be described according to the appended drawings in which.

DETAILED DESCRIPTION OF DISCLOSED EMBODIMENTS

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

Figure 1:
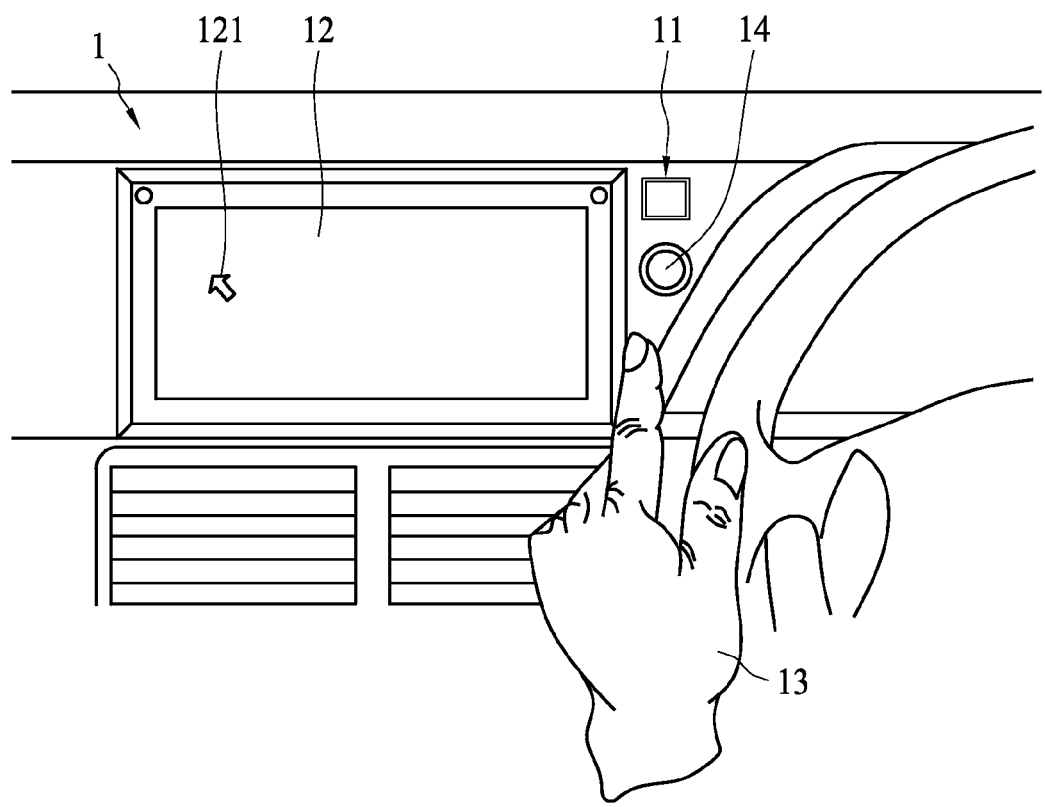
FIG. 1 is a schematic view showing an electronic system according to one embodiment of the present invention.

FIG. 1 is a schematic view showing an electronic system 1 according to one embodiment of the present invention. As shown in FIG. 1, the electronic system 1 comprises an image-sensing device 11, which can produce a picture. The image-sensing device 11 may be configured to acquire and then analyze a characteristic value of the picture.

In some embodiments, the image-sensing device 11 is configured to generate a picture, which includes an image created by an object 13. The electronic system 1 can execute a corresponding application according to the result of analyzing the image of the object 13 in the picture.

In FIG. 1, the object 13 is depicted as a finger; however, the present invention is not limited to such embodiment.

In some embodiments, the object 13 reflects light to form an object image in a picture.

In some embodiments, the electronic system 1 may comprise a screen 12, and the electronic system 1 is configured to control a cursor 121 on the screen 12 by the result of analyzing the images of the object 13 on the pictures. In some embodiments, the image of the object 13 is mapped to the cursor 121 on the screen 12.

In the embodiment of FIG. 1, although the electronic system 1 is depicted as a car's electronic system, the present invention is not limited to such embodiment. The electronic system 1 can be applied in other vehicles or non-vehicles. The electronic system 1 may be deployed in any portable product. The electronic system 1 may be disposed in any electronic product that is stationarily deployed in any location.

In some embodiments, the electronic system 1 may comprise a lighting device 14. The lighting device 14 is configured to allow, when the image-sensing device 11 is taking a picture, the object 13 to form a bright image on the picture. In some embodiments, the image-sensing device 11 and the lighting device 14 can be integrally formed into a module.

Figure 2:
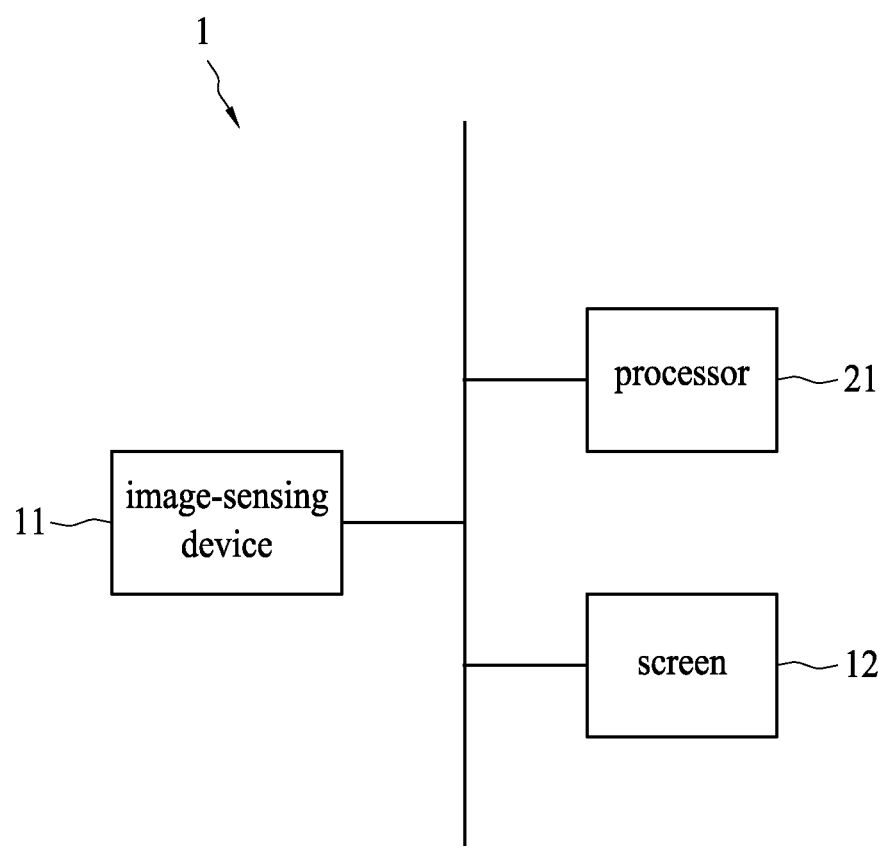
FIG. 2 is a block diagram of the electronic system according to one embodiment of the present invention.
Figure 3:
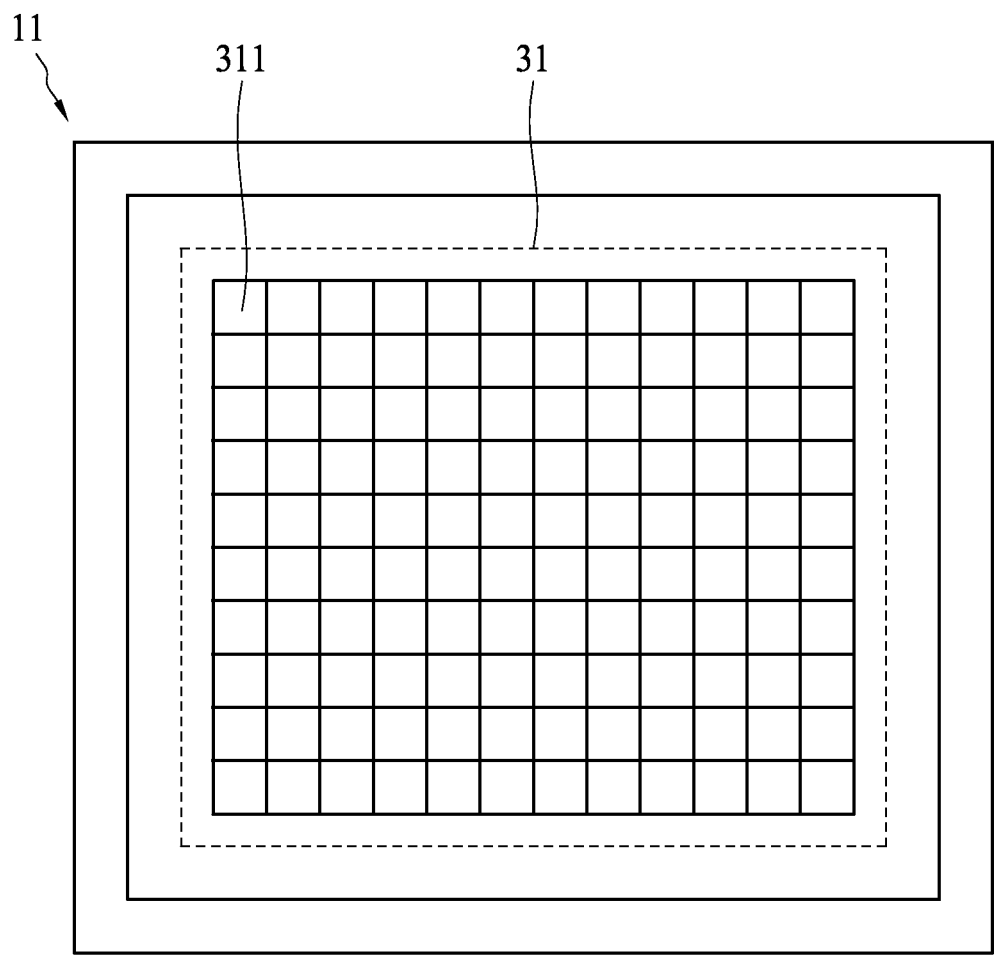
FIG. 3 is a schematic view showing an image-sensing device according to one embodiment of the present invention.

FIG. 2 is a block diagram of the electronic system 1 according to one embodiment of the present invention and FIG. 3 is a schematic view showing an image-sensing device 11 according to one embodiment of the present invention. Referring to FIGS. 1-3, the electronic system 1 may comprise a processor 21, which can be coupled with the image-sensing device 11. The processor 21 may be configured to analyze the picture generated by the image-sensing device 11.

In some embodiments, the processor 21 may be configured to correlate the object images of a plurality of pictures to calculate the displacement of the object 13. In some embodiments, the processor 21 is configured to calculate coordinate data relating to the object images of pictures and map the coordinate data onto the screen 12.

In some embodiments, as shown in FIG. 3, the image-sensing device 11 may comprise a plurality of sensing elements 311, which are closely arranged in order to form an image-sensing area 31. In some embodiments, the sensing element 311 comprises a CMOS sensing element, a CCD sensing element or the like.

Figure 4:
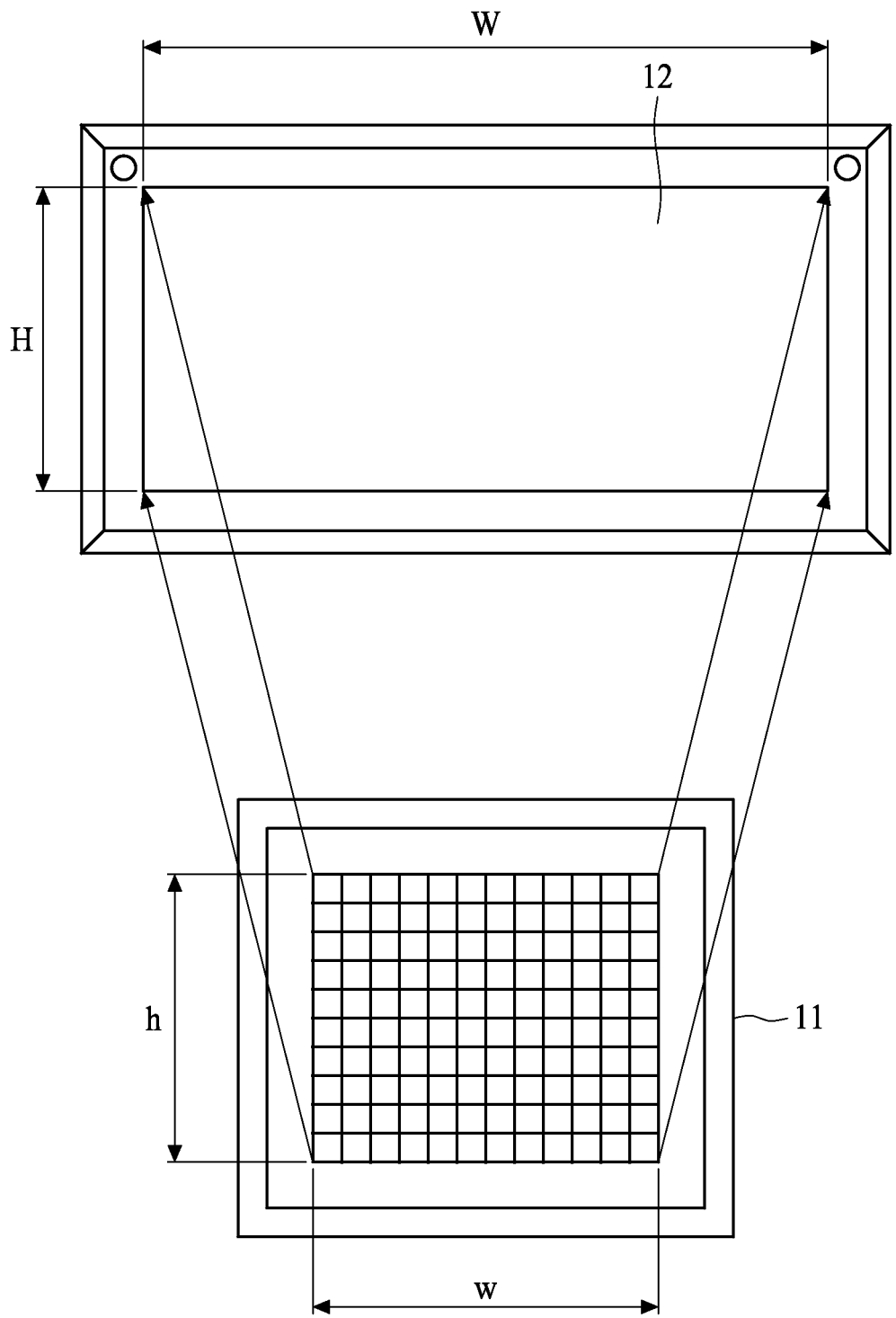
FIG. 4 is a schematic view showing the mapping between an image-sensing area and a screen according to one embodiment of the present invention.

The processor 21 may determine mapping data between the image-sensing area 31 and the screen 12 to establish the mapping relationship between the image-sensing area 31 and the screen 12 as shown in FIG. 4. In some embodiments, the mapping data may comprise a ratio (W/w or H/h) of corresponding sides of the image-sensing area 31 and the screen 12. In some embodiments, the mapping between the image-sensing area 31 and the screen 12 is determined by a more complex method, in which the mapping data may comprise of conversion coefficients.

Figure 5:
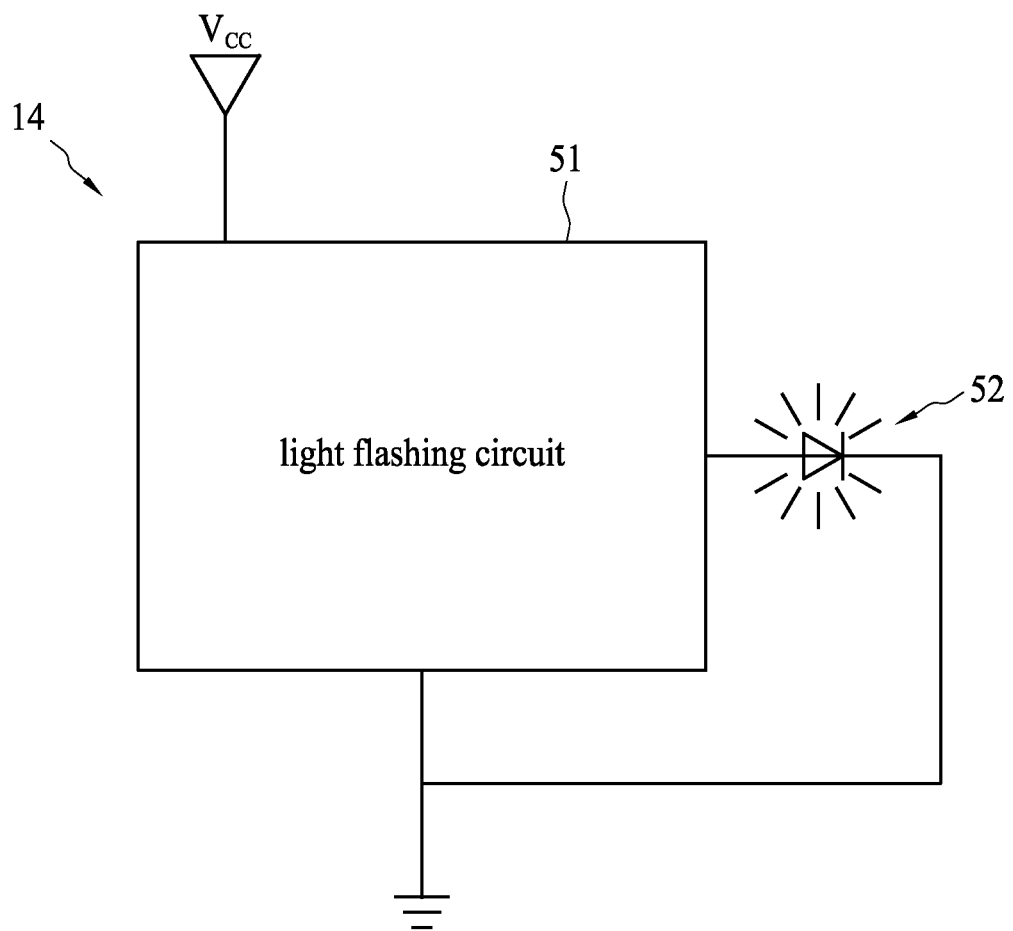
FIG. 5 is a schematic view showing a circuit of the lighting device according to one embodiment of the present invention.

FIG. 5 is a schematic view showing a circuit of the lighting device 14 according to one embodiment of the present invention. Referring to FIGS. 1 and 5, the lighting device 14 may emit intermittent light. The lighting device 14 may comprise a light flashing circuit 51, which may be coupled with a light emitting element 52. A power supply Vcc is configured to provide the light flashing circuit 51 with electrical power. The light flashing circuit 51 is configured to provide the light emitting element 52 with intermittent electrical signals. The light emitting element 52 may comprise a light bulb, a light emitting diode or other suitable light sources.

The light flash frequency of the lighting device 14 may be determined by the frame rate of the image-sensing device 11 such that in a plurality of pictures, the image of the object 13 can be easily distinguished from the noisy region occurring in each picture. For example, as shown in FIGS. 6A to 6C, when the light flash frequency of the lighting device 14 is half of the frame rate of the image-sensing device 11, in a plurality of successive pictures 61 to 63, the object image 64 alternately occurs in the pictures 61 and 63.

Figure 6:
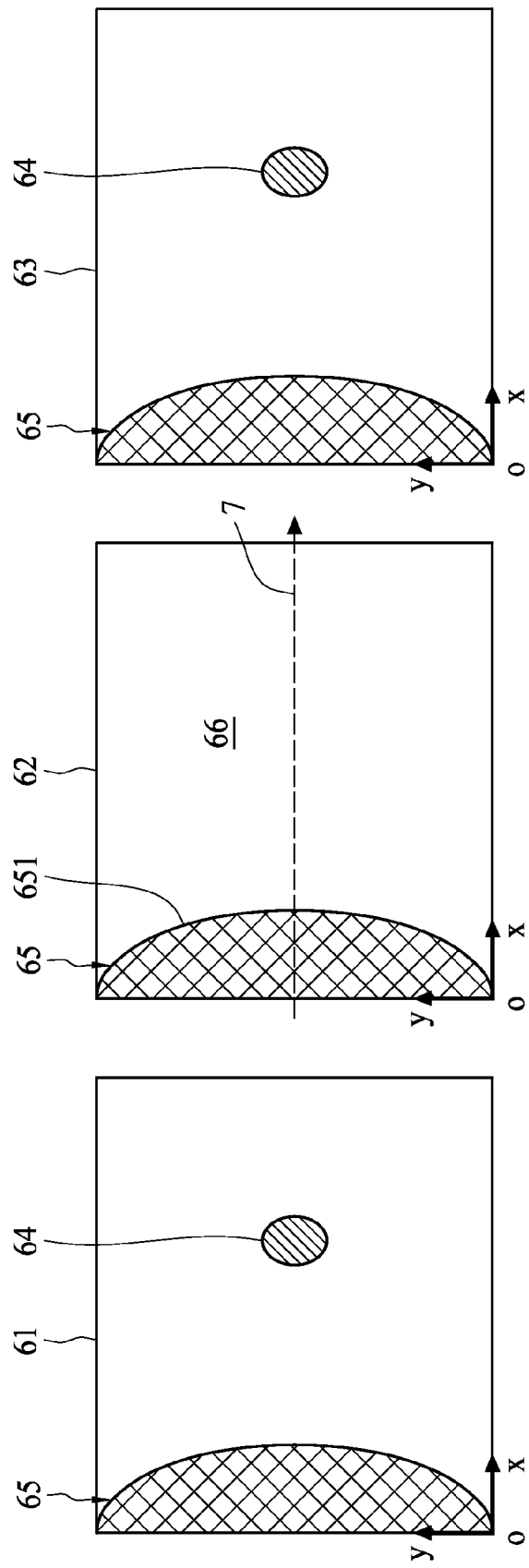
FIGS. 6A to 6C demonstrate a plurality of successively generated pictures according to one embodiment of the present invention.

Referring to FIGS. 6A to 6C, under some circumstances, the image-sensing device 11 is interfered and generates pictures 61 to 63, each comprising a noisy region 65. The interference may come from non-uniform environmental light or heat, in which the environmental light may be generated by the Sun or a light source. The interference may directly or indirectly cause the pictures 61 to 63 to include noisy regions 65.

The electronic system 1 can distinguish the noisy region 65 from an object image. In some embodiments, when the noisy regions 65 continue occurring in a series of pictures 61 to 63, the light flash frequency of the lighting device 14 is adjusted such that the object image 64 is alternately formed in the series of pictures 61 to 63, and the electronic system 1 can determine which is the object image 64 or which is the noisy regions 65 by the appearing frequencies of the object image 64 and the noisy regions 65.

In addition to the above method, other methods may be applicable. Referring to FIGS. 6A to 6C, the electronic system 1 can compare the pictures 61 to 63 and determine that the object image 64 is formed in the picture of FIG. 6A, but not in the picture of FIG. 6B, and consequently determine that the object image 64 is created by an object. Alternatively, after comparison, the electronic system 1 can determine that FIGS. 6A to 6C all have a noisy region 65, and therefore, determine that the noisy region 65 is not created by an object.

In some embodiments, when the lighting device 14 is turned off, an object will not form an image on a picture generated by the image-sensing device 11. Accordingly, the processor 21 can determine whether there is a noisy region 65 by a plurality of pictures generated by the image-sensing device 11 when the lighting device 14 is turned off.

In some embodiments, when the processor 21 determines that there are noisy regions 65 in a plurality of pictures generated by the image-sensing device 11 when the lighting device 14 is turned off, the processor 21 then proceeds to the step of selecting a tracking region.

Figure 7:
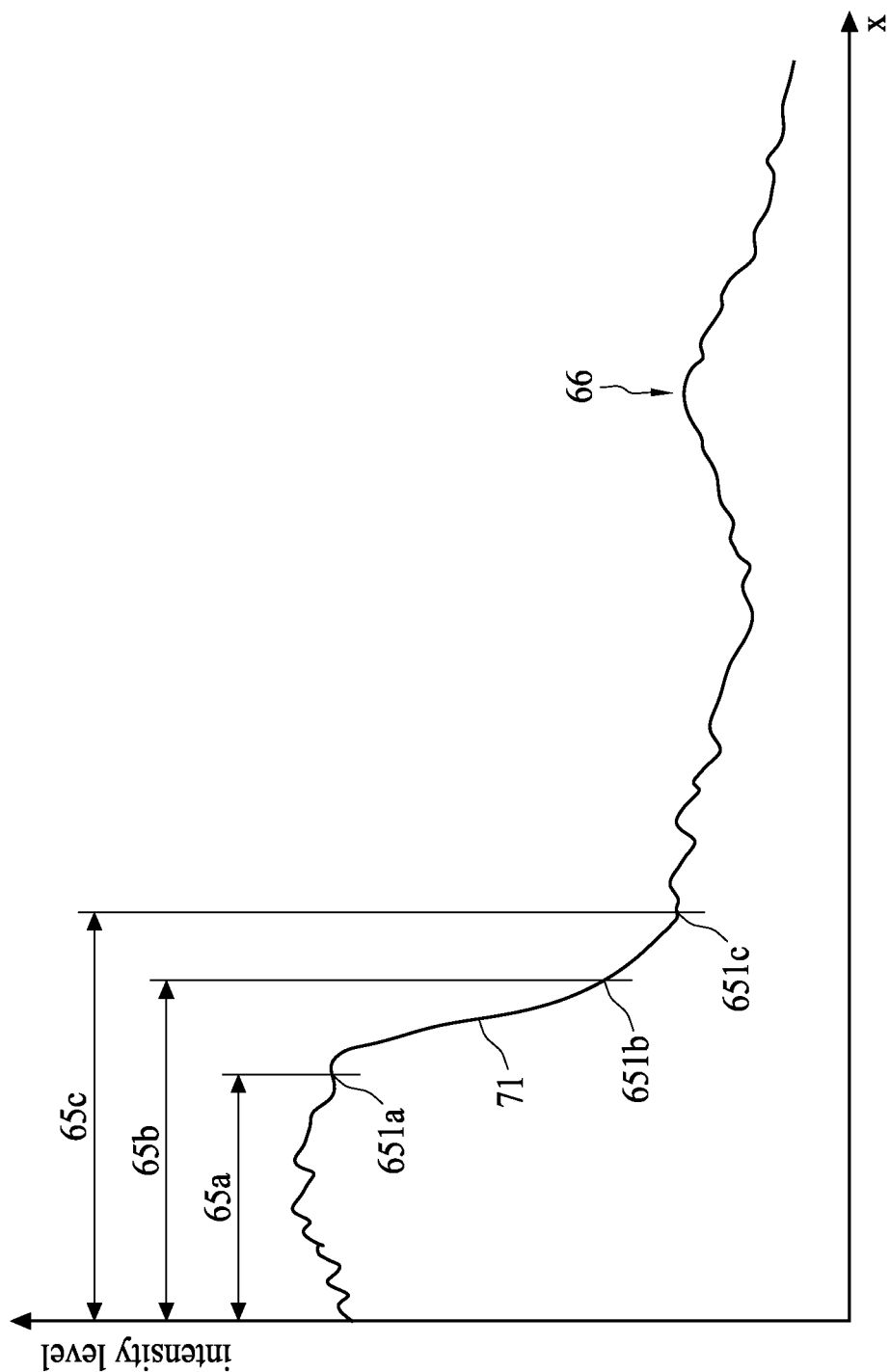
FIG. 7 is a diagram showing pixel intensity levels along line 7 of FIG. 6B.

As shown in FIGS. 6B and 7, in the present embodiment, the brightness level of the noisy region 65 is higher than that of the background 66; however, the present invention is not limited to such embodiment. The boundary pixel 651 of a noisy region 65 can be determined by several methods. In some embodiments, as shown in FIG. 7, a boundary pixel 651b of a noisy region 65b can be any pixel on a signal edge 71.

Furthermore, the boundary pixel 651 of the noisy region 65 can be a pixel that is not on the signal edge 71. In some embodiments, a boundary pixel 651a is selected and the noisy region 65a is determined, and the boundary pixel 651a can be the pixel that is located more inner than the signal edge 71 but adjacent to the signal edge 71. In some embodiments, the boundary pixel 651c is selected and the noisy region 65c is determined, and the boundary pixel 651c is at the outside of the signal edge 71 but adjacent to the signal edge 71.

Figure 8:
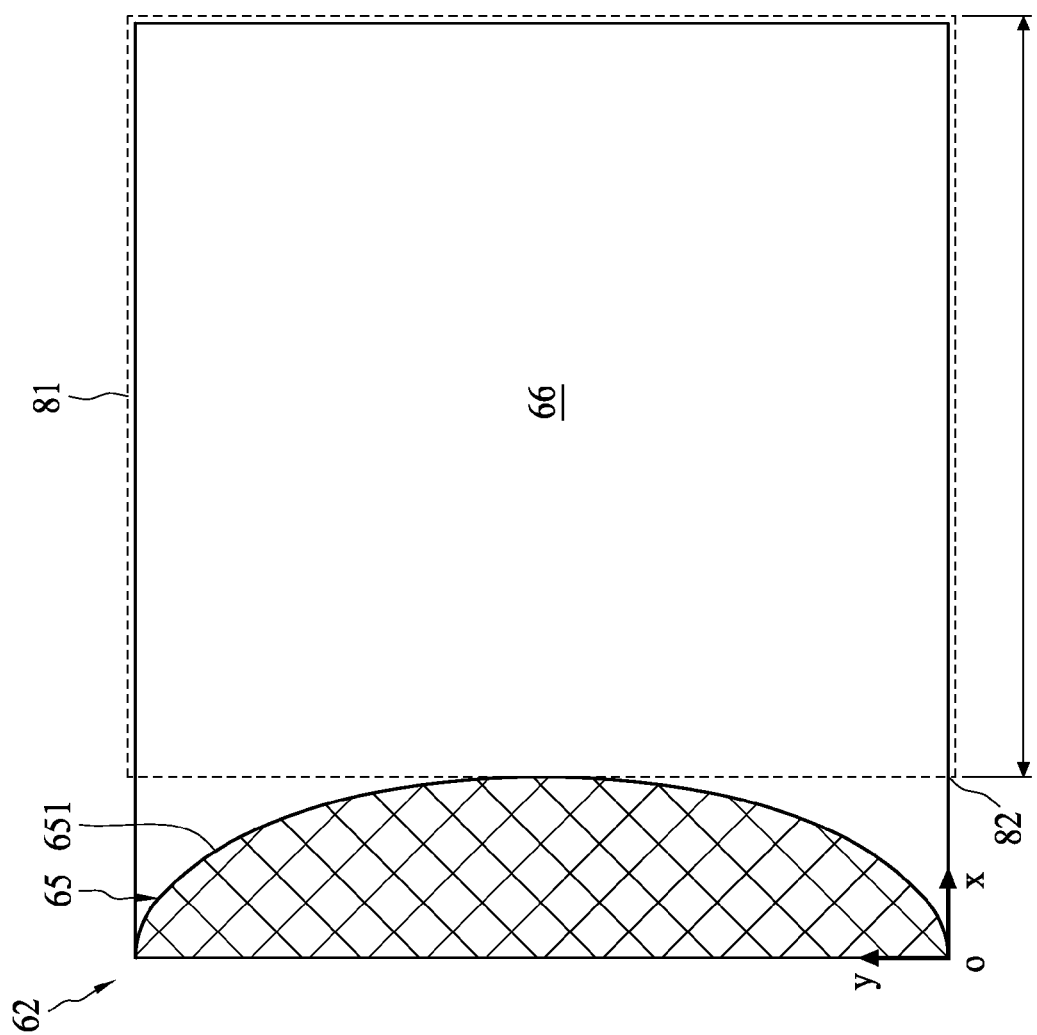
FIG. 8 is a schematic view showing a picture including a noisy region according to one embodiment of the present invention.

Referring to FIGS. 3 and 8, when the processor 21 determines that there is a noisy region 65 in the picture 62, the processor 21 may select a tracking region 81 from the background portion 66 of the picture outside of the noisy region 65 of the picture 62. The processor 21 then uses the tracking region 81 to track the position or movement of an object. As a result, the tracking of an object will not be affected by the noisy region.

The processor 21 may first identify the noisy region 65, and then determine coordinate data or a position 82, wherein the position 82 can be used to determine a tracking region 81. In some embodiments, if the left lower corner of the picture 62 is considered as the origin O and when the noisy region 65 is on the left side of the picture 62, as shown in FIG. 8, the processor 21 may first determine the boundary pixels 651 defining the noisy region 65. Next, the processor 21 determines the boundary pixel 651 is having the maximum x coordinate. Thereafter, the processor 21 may select the boundary pixel 651 with a maximum x coordinate or a pixel adjacent to the boundary pixel 651 with the maximum x coordinate as the position 82 for determining the tracking region 81. In some embodiments, if the noisy region 65 is on the right side of the picture 62, the boundary pixel with a minimum x coordinate or the pixel adjacent to the boundary pixel with the minimum x coordinate is selected. Similarly, if the noisy region 65 is on the upper side of the picture 62, the pixel with a minimum y coordinate or the pixel adjacent to the pixel with the minimum y coordinate is selected. If the noisy region 65 is on the lower side of the picture 62, the pixel with a maximum y coordinate or the pixel adjacent to the pixel with the maximum y coordinate is selected.

Figure 9:
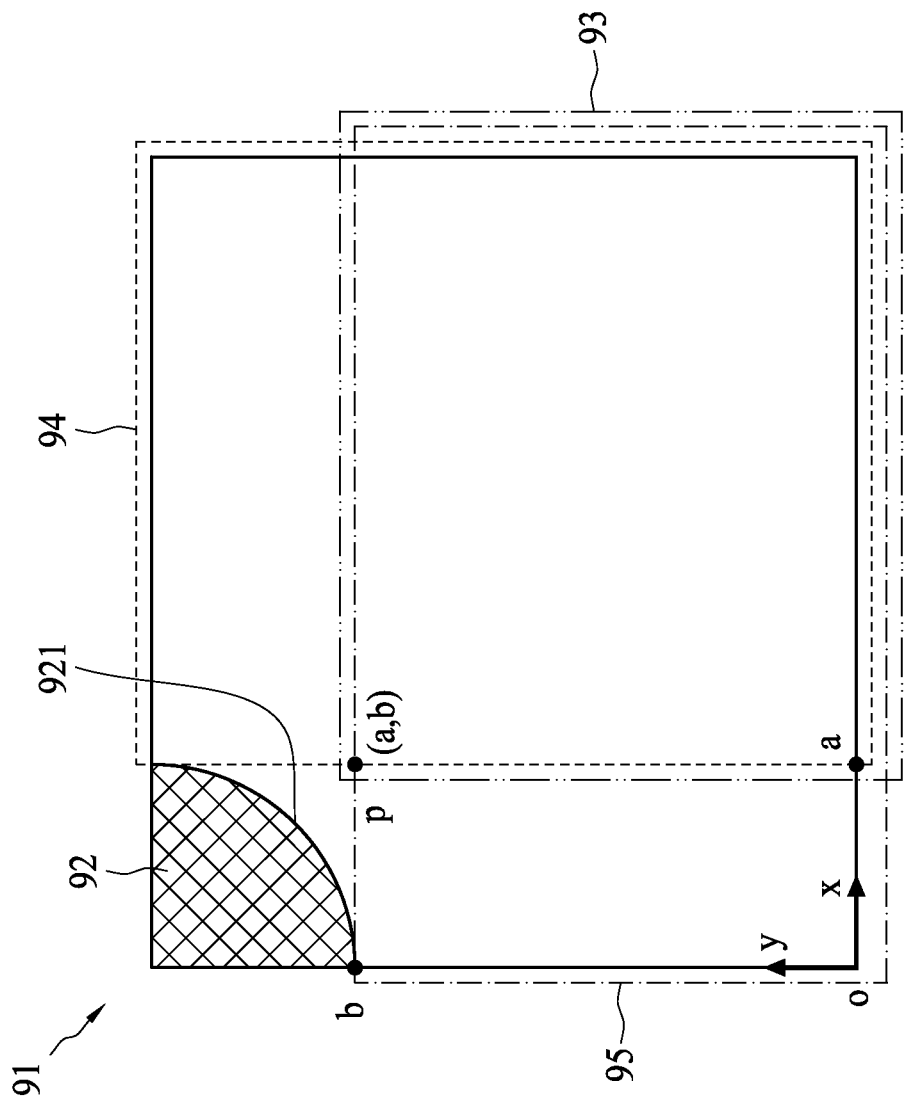
FIG. 9 is a schematic view showing a picture including a noisy region according to another embodiment of the present invention.

When the noisy region is on a corner of a picture, a position adjacent to the corner and the noisy region is determined for defining a tracking region. In some embodiments, as shown in FIG. 9, a maximum x coordinate is determined by the coordinate data of the boundary pixels 921 of the noisy region 92 of the picture 91, and a number "a" is determined by the maximum x coordinate, wherein the number "a" can be the maximum x coordinate or a number close to the maximum x coordinate. Next, a minimum y coordinate is determined by the coordinate data of the boundary pixels 921 of the noisy region 92, and a number "b" is determined by the minimum y coordinate, wherein the number "b" can be the minimum y coordinate or a number close to the minimum y coordinate. Consequently, the processor 21 can determine a pixel position P(a, b) that can be used to determine a tracking region 93.

In addition, the tracking region 93 can be obtained by another method. First, a first maximum region (i.e., the candidate tracking region 95 of FIG. 9) is determined, wherein the first maximum region comprises a plurality of successive rows of pixels that do not include any pixel of the noisy region. Next, a second maximum region (i.e., the candidate tracking region 94 of FIG. 9) is determined, wherein the second maximum region comprises a plurality of successive columns of pixels that do not comprise any pixel of the noisy region. Finally, the intersection region of the first and second maximum regions is determined. In the present embodiment, the intersection region determined by the above-mentioned steps can be considered as the tracking region 93.

The tracking region can be the region with a maximum area selected from a plurality of candidate rectangular regions. Referring to FIG. 9, in some embodiments, the processor 21 determines a candidate tracking region 94 using the number "a" and another candidate tracking region 95 using the number "b". Next, the processor 21 determines the region with the maximum area from the candidate tracking region 94 and the candidate tracking region 95.

Figure 10:
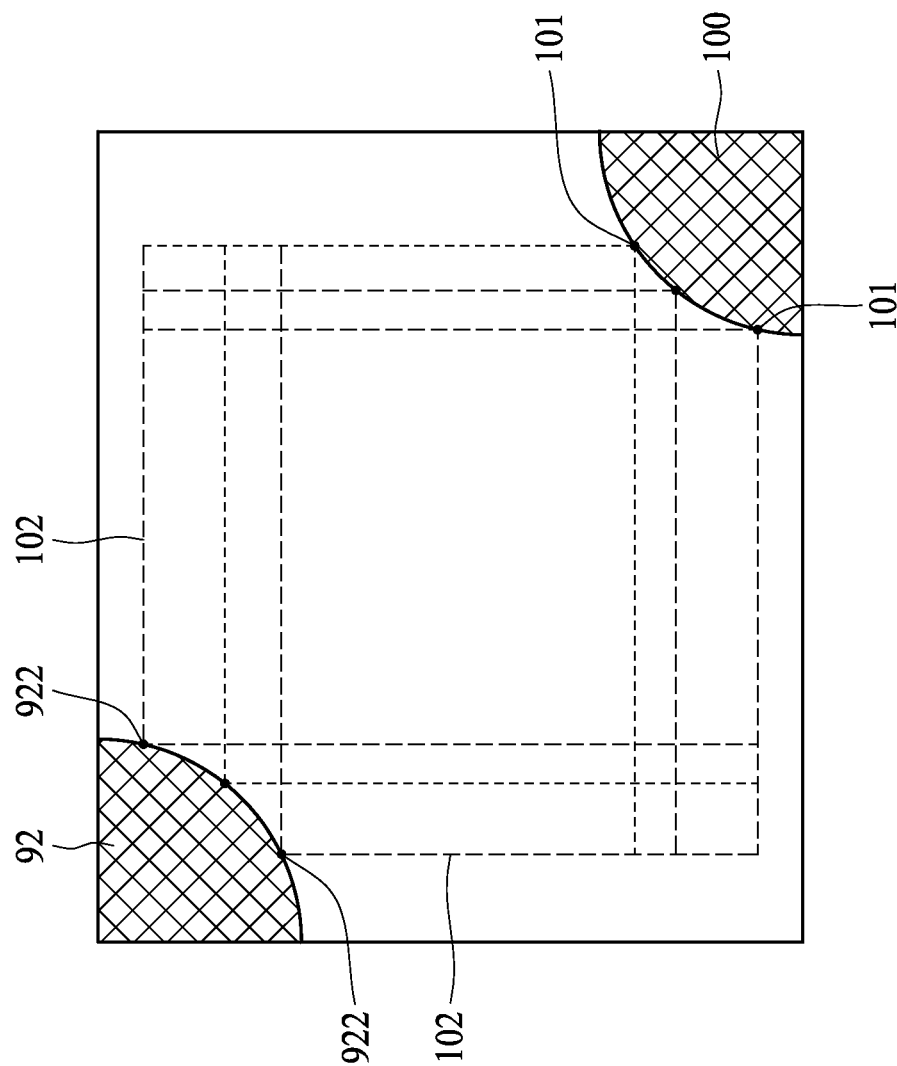
FIG. 10 is a schematic view showing a picture including a plurality of noisy regions according to one embodiment of the present invention.

The plurality of candidate rectangular regions can be determined by another method. Referring to FIG. 10, in some embodiments, a plurality of boundary pixels 922 of a noisy region 92 and a plurality of boundary pixels 101 of a noisy region 100 can be determined. Next, a pixel is selected from the boundary pixels 922 as one of the opposite corner points of a candidate tracking region 102 and a pixel is selected from the boundary pixels 101 as another of the opposite corner points of the candidate tracking region 102, and the area of the candidate tracking region 102 is calculated. The pixel selection and the area calculation in the above manner continue until all possible combinations are exhausted. Finally, the processor 21 determines the rectangular tracking region with the maximum area and records the coordinate data of the corresponding boundary pixel 922 and 101.

The tracking region can be the rectangular tracking region with a maximum area that can be obtained from the portion of a picture outside the noisy region. Referring to FIG. 10, in some embodiments, the processor 21 selects a pixel from the boundary pixels of the noisy region 92 and a pixel from the boundary pixels of the noisy region 100 as opposite corner points of a candidate rectangular tracking region, and calculates the area of the candidate rectangular tracking region. The above step continues to combine another two boundary pixels of the noisy region 92 and 100 until all possible combinations are exhausted. Finally, the processor 21 selects the rectangular tracking region with the maximum area and records the coordinate data of the corresponding boundary pixel 922 and 101.

Figure 11:
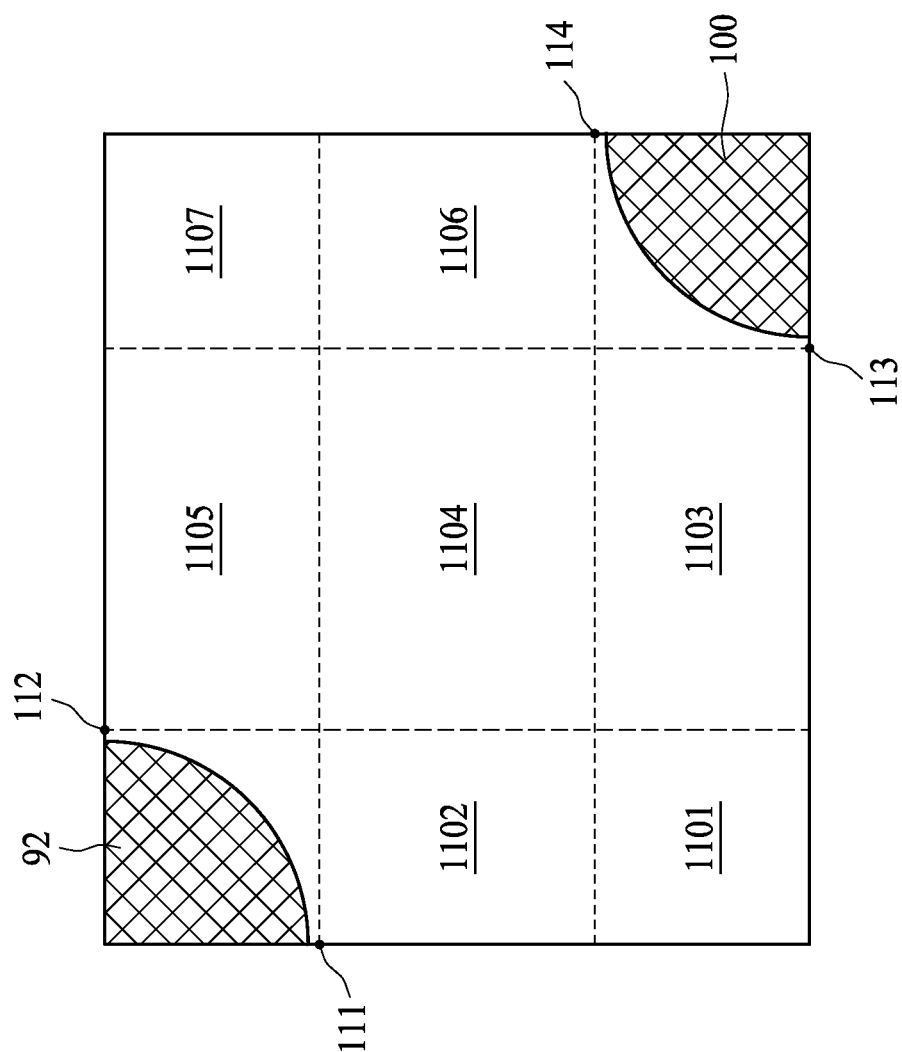
FIG. 11 is a schematic view showing a picture including a plurality of noisy regions according to another embodiment of the present invention.

When noisy regions are on the two corners of a picture, the following method can be applied to obtain a tracking region. Referring to FIG. 11, pixels 111 and 112 of the edges of the picture that are adjacent to the noisy region 92 are selected, wherein the pixels 111 and 112 can be boundary pixels of the noisy region 92 or pixels adjacent to the boundary of the noisy region 92. Pixels 113 and 114 of the edges of the picture that are adjacent to the noisy region 100 are selected, wherein the pixels 113 and 114 can be boundary pixels of the noisy region 92 or pixels adjacent to the boundary of the noisy region 100. The picture can be divided into a plurality of rectangular sections 1101 to 1106 using the pixels 111 and 112 and the pixels 113 and 114. The rectangular sections 1101 to 1106 can be used to form a plurality of candidate rectangular tracking regions. Usually, the rectangular tracking region with the maximum area is chosen as the embodiment; however, the final choice can be adjusted by the user's design and requirement.

Figure 12:
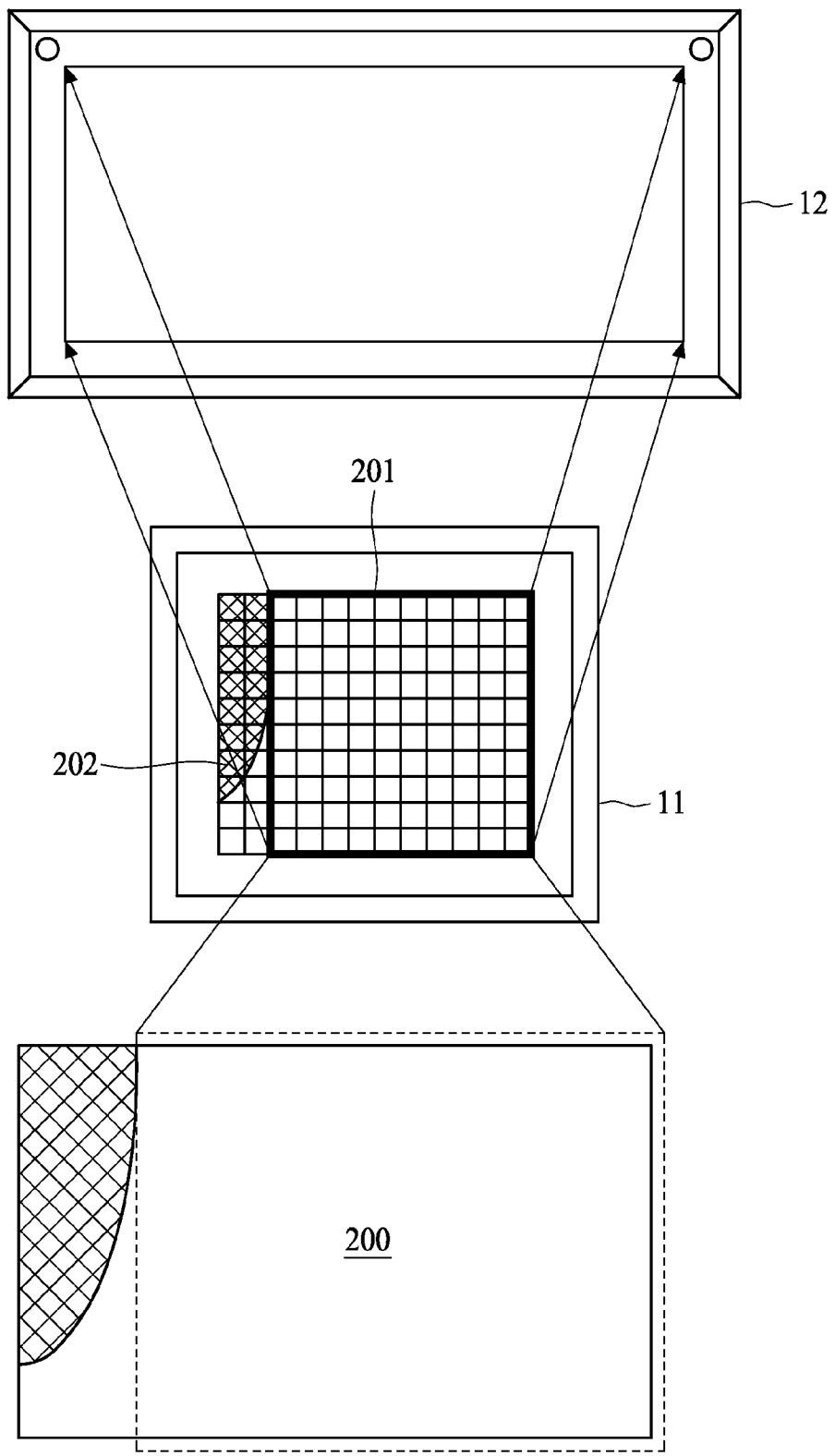
FIG. 12 is a schematic view showing the mapping between a tracking region/operative region and a screen according to one embodiment of the present invention.

Referring to FIG. 12, when a local area 202 of an image-sensing device 11 is adversely affected and generates large noise, object images in the region of a picture corresponding to the local area 202 cannot be properly determined and distinguished. As a result, the cursor that moves into a local area of a screen mapped to the local area 202 cannot be normally manipulated. To solve the issue, in one embodiment, the processor 21, after it obtains a tracking region 200, determines an operative region 201 of the image-sensing device 11 corresponding to the tracking region 200. The processor 21 can, also calculate mapping data between the operative region 201 (or the tracking region 200) and the screen 12 to obtain a new mapping relationship. Accordingly, the electronic system 1 can use the operative region 201 to track the position or movement of an object, and the tracking is result can be used to perform full screen operations. Therefore, when a local area 202 does not function well, the situation in which a cursor cannot be properly operated in a local area of a screen cannot happen.

Under some circumstances, the processor 21 may decide to not use an operative region or a tracking region. In some embodiments, the processor 21 may compare a characteristic value of a tracking region with a threshold. When the characteristic value is less than the threshold, the processor 21 may stop outputting coordinate data of the object or moving distances of the object because the electronic system 1 is too sensitive to the movement of an object.

In some embodiments, the characteristic value may comprise a dimension of the tracking region, wherein the dimension is a length, a diagonal or the like. In some embodiments, the characteristic value may comprise the area of the tracking region.

Referring to FIG. 1, under some circumstances, when the operative region or the tracking region is too small, the operation mode of the electronic system 1 may be changed. In some embodiments, the electronic system 1 may use the bright image of an object to calculate the coordinate or moving distance data of the object. When the processor 21 determines that a characteristic value of a tracking region is less than a threshold, the image-sensing device 11 generates a first picture (P1), wherein the first picture (P1) is taken when the lighting device 14 is turned off so that the first picture (P1) comprises a dark image of the object. Moreover, the image-sensing device 11 generates a second picture (P2), wherein the second picture (P2) is taken when the lighting device 14 is turned on so that the second picture (P2) comprises a bright image of the object. The processor 21 then subtracts the second picture (P2) from the first picture (P1) to obtain a subtraction picture (P1-P2), which includes a dark image of the object. The processor 21 then determines the coordinate or moving distance data of the object according to the dark image of the object in the subtraction picture.

Figure 13A:
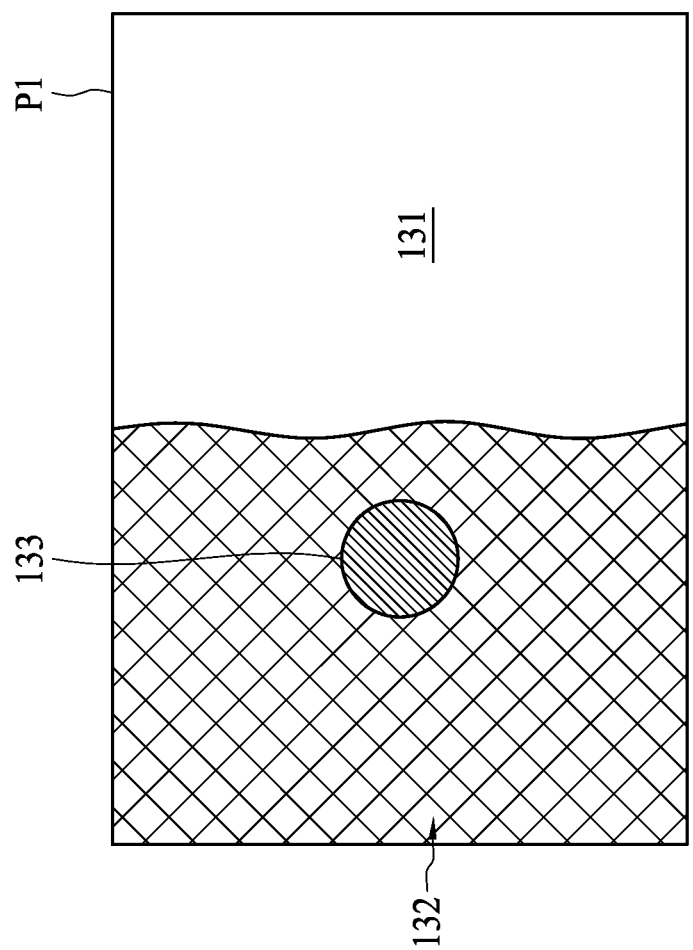
FIG. 13A is a schematic view showing a picture taken when a light source is turned off according to one embodiment of the present invention.
Figure 13B:
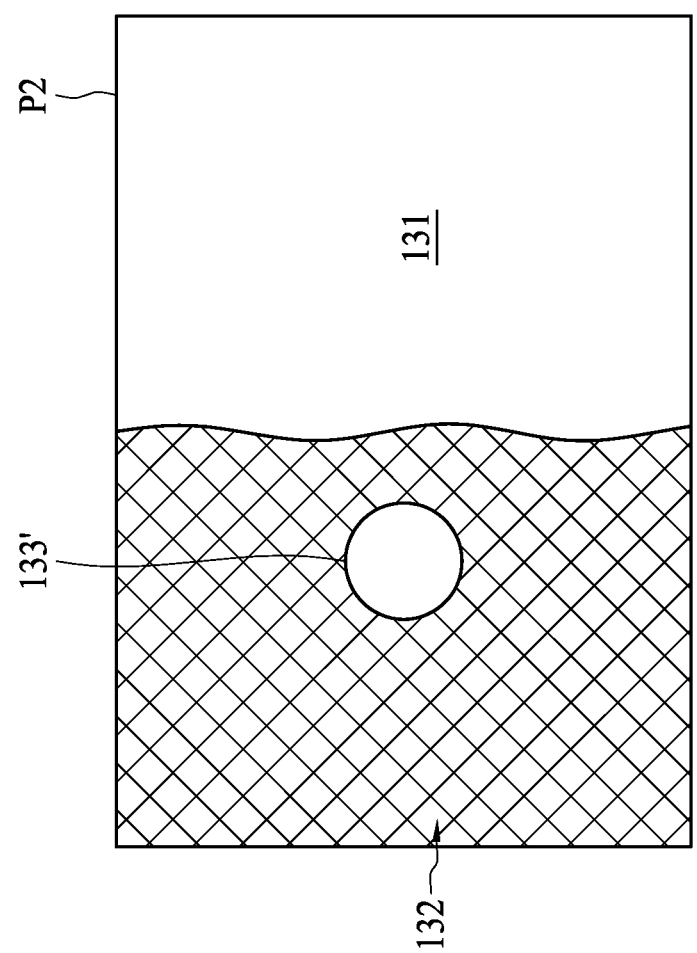
FIG. 13B is a schematic view showing a picture taken when a light source is turned on according to one embodiment of the present invention.
Figure 13C:
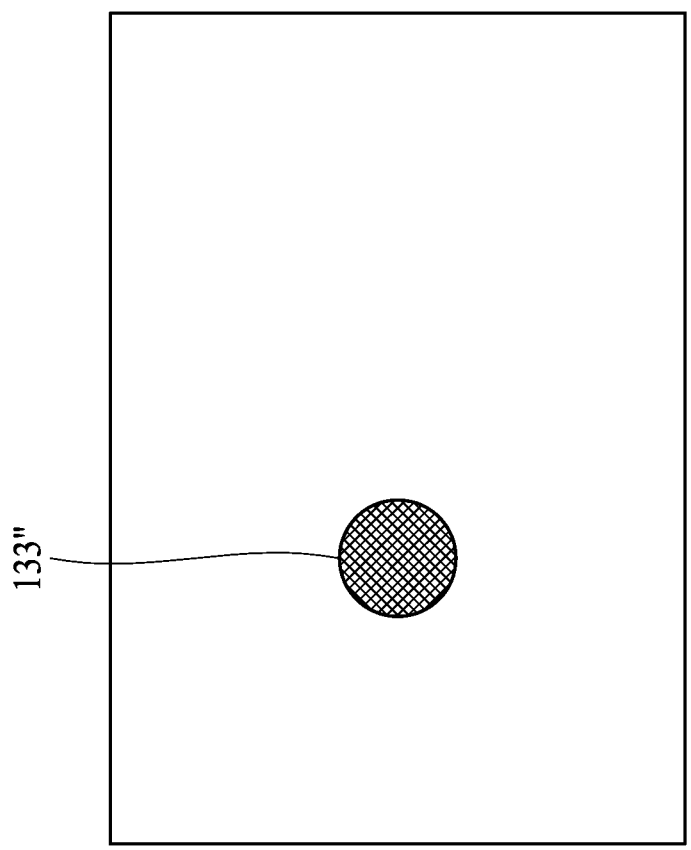
FIG. 13C is a schematic view showing a subtraction picture obtained by the subtraction of the pictures of FIGS. 13A and 13B according to one embodiment of the present invention.

For example, as shown in FIGS. 1, 5, and 13A to 13C, when the operative region or the tracking region 131 is too small, it indicates that the noisy region 132 is huge. Under such a situation, when the first picture (P1) is taken without the light emitting element 52 being turned on, the hand portion of a user may block a portion of light that creates the noisy region 132, and then forms a dark image 133 (FIG. 13A). Alternatively, when the second picture (P2) is generated with the light emitting element 52 being turned on, the hand portion of the user may form a bright image 133' (FIG. 13B) on the second picture (P2). When the second picture is subtracted to form the first picture (P1-P2), a dark image 133" (FIG. 13C) of the hand portion can be obtained. The above embodiment is explained using a hand portion; however, the present invention is not limited to using a hand portion. Specifically, the dark image 133" (FIG. 13C) has grey levels lower than those of its surrounding area. In another embodiment, the first picture can be subtracted from the second picture, and a bright image of the hand portion can be obtained, wherein the bright image has grey levels higher than those of its surrounding area.

The above embodiments are demonstrated using rectangular tracking regions; however, the present invention is not limited to using rectangular tracking regions, and tracking regions with other shapes are applicable as well.

It will be apparent to those skilled in the art that various modifications can be made to the disclosed embodiments. It is intended that the specification and examples be considered as exemplary only, with the true scope of the disclosure being indicated by the following claims and their equivalents.

What is claimed is:

1. An electronic system comprising:
   an image-sensing device comprising an image-sensing area that generates a picture comprising a noisy region; and
   a processor coupled with the image-sensing device, configured to select a tracking region from the portion of the picture outside the noisy region, wherein the tracking region corresponds to an operative region of the image-sensing area, wherein the tracking region is an intersection region of a first region and a second region, wherein the first region comprises a plurality of successive rows of pixels, which do not include any pixel of the noisy region, and the second region comprises a plurality of successive columns of pixels, which do not include any pixel of the noisy region.

2. The electronic system of claim 1, comprising a screen, wherein the processor is configured to determine mapping data between the screen and the operative region.

3. The electronic system of claim 1, wherein an edge of the tracking region is adjacent to or passes through a boundary pixel of the noisy region.

4. The electronic system of claim 1, wherein the processor is configured to determine coordinate data of boundary pixels of the noisy region and to determine the tracking region using the coordinate data of the boundary pixels.

5. The electronic system of claim 1, wherein the processor is configured to use a characteristic value of the tracking region to determine whether to output coordinate data.

6. The electronic system of claim 1, further comprising a lighting device, wherein the processor is configured to subtract a second picture from a first picture when a characteristic value of the tracking region is less than a threshold, wherein the first picture comprises a dark image of an object taken when the lighting device is turned off, and the second picture comprises a bright image of the object taken when the object is illuminated by the lighting device.

7. The electronic system of claim 1, further comprising a lighting device configured to emit intermittent light, which allows an object to alternatively form bright images in a plurality of successive pictures.

8. The electronic system of claim 7, wherein the noisy region occurs in each picture of the plurality of successive pictures.

9. An electronic system comprising:
   an image-sensing device generating a picture comprising a noisy region; and
   a processor coupled with the image-sensing device, wherein the processor is configured to determine an edge of the noisy region, a portion of the picture outside the noisy region by the edge of the noisy region and a plurality of tracking regions from the portion of the picture, and to select a tracking region with a maximum area from the plurality of tracking regions.

10. The electronic system of claim 9, further comprising a screen, wherein the processor is configured to determine mapping data between the screen and the tracking region with a maximum area.

11. The electronic system of claim 9, wherein an edge of the tracking region with a maximum area is adjacent to or passes through a boundary pixel of the noisy region.

12. The electronic system of claim 9, wherein the processor is configured to use a characteristic value of the tracking region with a maximum area to determine whether to output coordinate data.

13. The electronic system of claim 9, further comprising a lighting device, wherein the processor is configured to subtract a second picture from a first picture when a characteristic value of the tracking region with a maximum area is less than a threshold, wherein the first picture comprises a dark image of an object taken when the lighting device is turned off, and the second picture comprises a bright image of the object taken when the object is illuminated by the lighting device.

14. The electronic system of claim 9, further comprising a lighting device configured to emit intermittent light, which allows an object to alternatively form bright images in a plurality of successive pictures.

15. The electronic system of claim 14, wherein the noisy region occurs in each picture of the plurality of successive pictures.

16. The electronic system of claim 9, further comprising a screen, wherein the tracking region with a maximum area is a rectangular tracking region that can be determined from the portion of the picture outside of the noisy region.

* * * * *